(12) United States Patent
Fan et al.

(10) Patent No.: US 11,603,750 B2
(45) Date of Patent: Mar. 14, 2023

(54) REAL-TIME CALIBRATION OF EXCITATION RANGING FOR TRACKING WELLBORE DRILLING

(71) Applicant: Halliburton Energy Services, Inc., Houston, TX (US)

(72) Inventors: Yijing Fan, Singapore (SG); Hsu-Hsiang Wu, Sugarland, TX (US); Li Pan, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 749 days.

(21) Appl. No.: 16/342,187

(22) PCT Filed: Mar. 5, 2019

(86) PCT No.: PCT/US2019/020817
§ 371 (c)(1),
(2) Date: Apr. 15, 2019

(87) PCT Pub. No.: WO2020/180305
PCT Pub. Date: Sep. 10, 2020

(65) Prior Publication Data
US 2021/0355806 A1    Nov. 18, 2021

(51) Int. Cl.
*E21B 44/02*    (2006.01)
*E21B 47/0228*    (2012.01)
(Continued)

(52) U.S. Cl.
CPC ............. *E21B 44/02* (2013.01); *E21B 7/046* (2013.01); *E21B 47/0228* (2020.05);
(Continued)

(58) Field of Classification Search
CPC ...... E21B 44/02; E21B 47/0228; E21B 47/04; E21B 2200/20; E21B 7/046; G01V 3/30; G01V 3/38
(Continued)

(56) References Cited

U.S. PATENT DOCUMENTS 9,678,241 B2    6/2017   Zhang et al.
2009/0260878 A1   10/2009  Morley et al.
(Continued)

FOREIGN PATENT DOCUMENTS

WO    2018226233 A1    12/2018

OTHER PUBLICATIONS

Samuel, Robello, Olivier Germain, and Rui Gang. "Position/Fracture Uncertainty and Ranging During Drilling and Fracturing." SPE Annual Technical Conference and Exhibition. OnePetro, 2012. (Year: 2012).*

(Continued)

*Primary Examiner* — John E Johansen
(74) *Attorney, Agent, or Firm* — Delizio, Peacock, Lewin & Guerra

(57) ABSTRACT

A method includes generating a ranging model of a drilling wellbore to be drilled and generating a predicted signal along measured depths of the drilling wellbore based on the ranging model. The method includes performing the following operations until the drilling wellbore has been drilled to a defined depth. The following operations include drilling, with a drill string, the drilling wellbore to an increment of the defined depth and detecting, by a sensor positioned on the drill string, an electromagnetic field emanating from a target wellbore. The following operations include determining ranging measurements to the target wellbore at the increment based on the electromagnetic field and calibrating the predicted signal based on the ranging measurements. The (Continued)

following operations include determining ranging accuracy for all deeper depths in the wellbore and making drilling decisions or adjusting drilling operations based on the predicted ranging accuracy for deeper depths.

20 Claims, 12 Drawing Sheets

(51) Int. Cl.
  *G01V 3/30* (2006.01)
  *G01V 3/38* (2006.01)
  *E21B 47/04* (2012.01)
  *E21B 7/04* (2006.01)

(52) U.S. Cl.
  CPC ............... *E21B 47/04* (2013.01); *G01V 3/30* (2013.01); *G01V 3/38* (2013.01); *E21B 2200/20* (2020.05)

(58) Field of Classification Search
  USPC .......................................................... 703/13
  See application file for complete search history.

(56) References Cited

U.S. PATENT DOCUMENTS

| | | |
|---|---|---|
| 2010/0194395 A1 | 8/2010 | McElhinney |
| 2015/0378043 A1 | 12/2015 | Brooks |
| 2016/0041294 A1 | 2/2016 | Wu et al. |
| 2016/0041296 A1* | 2/2016 | Ahmad .................... G01V 3/38 |
| | | 324/346 |
| 2016/0273337 A1 | 9/2016 | Donderici et al. |
| 2016/0273343 A1* | 9/2016 | Donderici ................. E21B 7/04 |
| 2018/0258755 A1* | 9/2018 | Donderici ........... E21B 47/0228 |

OTHER PUBLICATIONS

Wu, et al., "A New Well Positioning Technique: Access-Independent Ranging Solution for Providing Accurate Well Completion", Society of Petroleum Engineers, SPE Annual Technical Conference and Exhibition, San Antonio, Texas, Oct. 2017, 9 pages.
PCT Application Serial No. PCT/US2019/020817, International Search Report, dated Dec. 3, 2019, 4 pages.
PCT Application Serial No. PCT/US2019/020817, International Written Opinion, dated Dec. 3, 2019, 7 pages.

* cited by examiner

REAL-TIME CALIBRATION OF EXCITATION RANGING FOR TRACKING WELLBORE DRILLING

TECHNICAL FIELD

The disclosure generally relates to wellbore drilling operations, and particularly to, real-time calibration of excitation ranging technique for tracking wellbore drilling relative to another wellbore.

BACKGROUND

Ranging techniques are used to determine distance and direction between wellbores in geological formations. Ranging techniques (which can assist in well planning) can involve drilling wellbore in close proximity to one or more existing wellbores. Placing multiple wellbores in close proximity may be advantageous in many drilling operations and well plans. For example, dense placement of wellbores may reduce environmental impact as well as maximize available space in areas where there is a limited amount of available area for wellheads (for example an offshore platform). Such wellbores may extend to a certain depths and direction in parallel before branching out before a "kick-off" point where the wellbores extend away. Certain oil drilling methods such as steam assisted gravity drainage (SAGD) requires shallow horizontal wellbore pairs to be drilled in parallel and can require ranging techniques.

There are various ranging techniques which allow construction of a wellbore in close proximity to an existing well, also known as a target wellbore. Active ranging is a ranging technique where an electromagnetic (EM) source is placed in the target wellbore and monitored via sensors on the drill string in the wellbore under construction. Active ranging methods however has significant drawbacks such as requiring access to both the drilling wellbore and target well, halt in production from the target well, and extensive use in equipment. Active ranging is also sensitive to precise axial alignment between the magnetic source deployed in the target wellbore and the sensor in the drilling well. Misalignment may result in misplacement of the drilling wellbore that decreases well productivity. Ensuring proper alignment in active ranging methods is labor and time intensive and may be difficult to carry out especially in wellbores that are deep.

Passive ranging avoids many of the limitations that exists in active systems. Passive ranging is a ranging technique that applies a current on the wellbore casing of the target wellbore to generate an EM field around the target well. A current source, often a low-frequency current, is connected to a target wellbore which results in currents flowing down the wellbore and leaking into the surrounding formation. This EM field may be detected by an EM field sensor system disposed in the drilling well.

DESCRIPTION OF EMBODIMENTS

Figure 1:
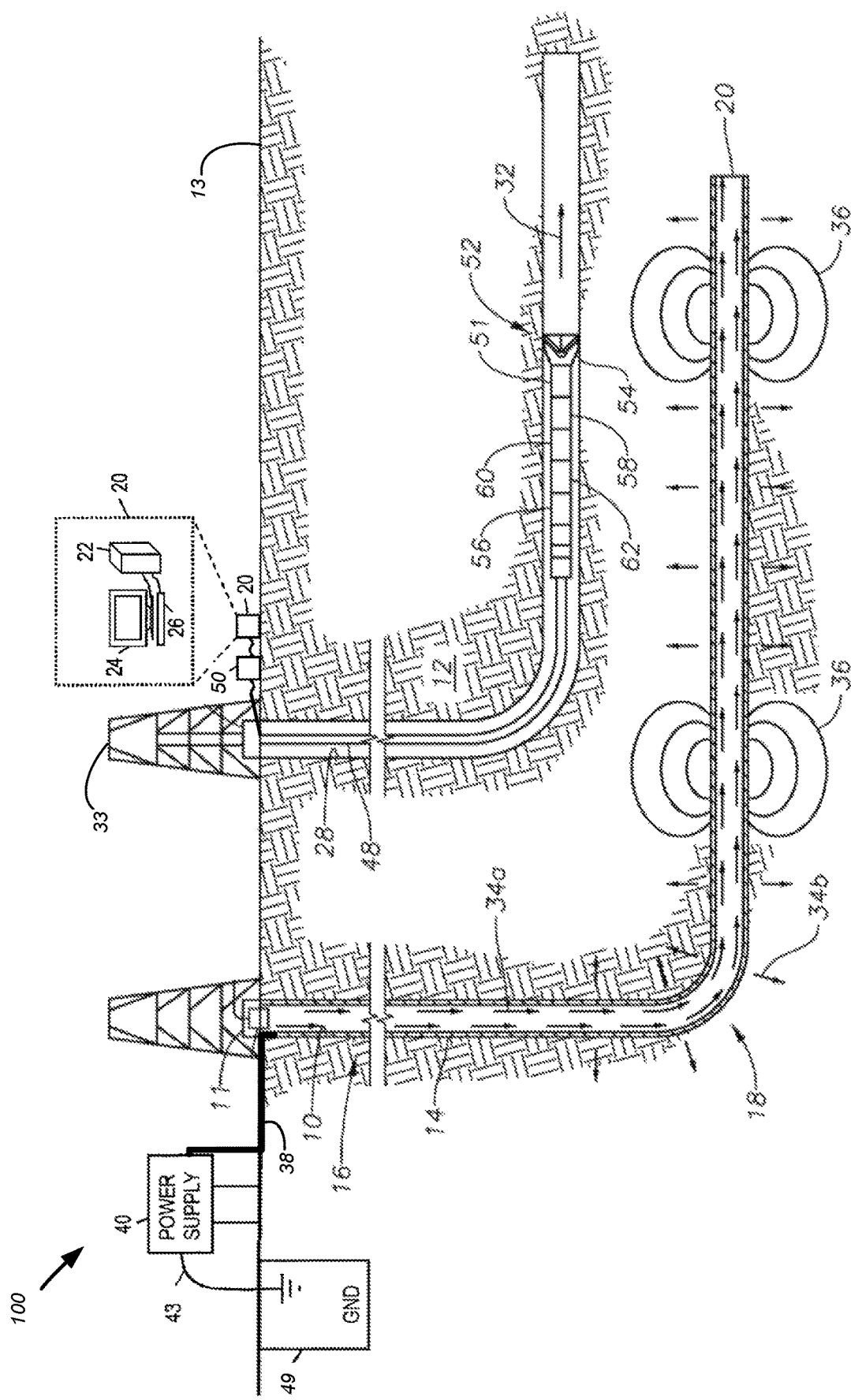
FIG. 1 depicts an example wellbore drilling system that uses real-time calibration of excitation ranging, according to some embodiments.

The description that follows includes example systems, methods, techniques, and program flows that embody embodiments of the disclosure. However, it is understood that this disclosure may be practiced without these specific details. For instance, this disclosure refers to running a current through the target wellbore casing in illustrative examples. Aspects of this disclosure can also be applied to any conductive member running coaxially along the length of the wellbore and the target wellbore may either be cased or uncased. The conductive member may be a casing or liner disposed within the target wellbore for cased wellbores or the conductive member may be a pipe string, tool string, tubing, electrical wire or other conductive body disposed in the target well. Furthermore, this disclosure depicts only one target wellbore paired with one drilling well, but aspects of this disclosure can be applied to plurality of combinations of both. In other instances, well-known protocols, structures and techniques have not been shown in detail in order not to obfuscate the description.

Some embodiments include a multi-step real-time ranging to determine distance and direction between a drilling wellbore and an existing wellbore (the target wellbore) in a geological formation for drilling the drilling wellbore. The real-time ranging can be a passive ranging wherein an EM field is generated around the target wellbore through a power source located at the surface that runs a current down the casing of the target well. In a first step of the multi-step real-time ranging, a numerical simulation is conducted before initiating drilling of the drilling well. The numerical simulation can determine the predicted signal before the drilling wellbore is drilled. This numerical simulation can be used to create a model of the EM field distribution around the target wellbore that an EM sensor placed in the drilling rig down the drilling wellbore is expected to measure. A predicted signal can be the expected EM field signal measurements given certain depth and resistivity of the formation around the casing. The expected strength and direction of the EM field can be obtained from the expected signal. Guided by the predicted EM field signal at each depth and the measured EM field signal from the EM sensor, the drilling rig bores a drilling wellbore at a certain position respective to the target well. Often the position of the drilling wellbore with respect to the target wellbore would be parallel at a fixed distance. The minimum distance can be equal to a distance needed so that the wellbores would not collide given the range of error and uncertainty of the predicted EM field. Thus, the minimum distance between the target wellbore and the drilling wellbore depends on the accuracy of the predicted field signal.

Obtaining an accurate representation of the predicted EM signal in a target wellbore can be further exacerbated by ranging errors introduced by inaccurate formation data and surrounding noise. In passive ranging, the numerical simulation is based on legacy data such as the historical formation data and wellbore surveys. These legacy data may not be accurate and may cause errors in the predicted signal. Inherent noise exists in all wellbores and can also contribute to the inaccuracy of the predicted signals.

Thus, various embodiments include a multi-stage real-time ranging that results in more accurate EM ranging by incorporating real-time EM sensor measurements to improve a formation representation and to calibrate predicted signals. First stage involves creating a ranging model of the wellbore formation that the different wellbores (i.e. target wellbore, drilling wellbore, and other surrounding wellbores) and formation layers generated from legacy data. Legacy data includes data obtained during the different stages in the lifetime of the wellbore including surveying, planning, drilling, and operating stages of the target well. In some embodiments, this ranging model may further be used to create a simplified ranging model with a single homogeneous formation of an estimated average formation resistivity.

Second stage includes obtaining real-time magnetic field signal measurements (emitted from the target well) by a sensor positioned on a drill string that is used to drill the drilling wellbore. These real-time magnetic field signal measurements can then be used to calculate a more accurate ranging model and expected predict signal. In some embodiments, the second stage can include applying real-time background noise around the sensor to factor in the effect of noise. Noise measurement can be randomly imposed to the magnetic field generated in the ranging model. By incorporating the real-time background noise, the signal-to-noise ratio (SNR) of the ranging system can be obtained to better predict the accuracy of ranging measurements.

Example Wellbore Drilling System

Various embodiments provide prediction of the ranging accuracy in real-time and better understanding of the ranging measurements at each location of the drilling well. The improved accuracy of the EM ranging reduces uncertainties and provides for increased hydrocarbon recovery. Various embodiments can further allow placing multiple wellbores in close proximity that may be advantageous in many drilling operations. For example, improvements in accuracy of ranging allows dense placement of wellbores that may reduce environmental impact, efficiently use available space in areas where there is a limited amount of available area for wellheads and improve drilling operations that use ranging.

FIG. 1 shows an example wellbore drilling system that uses real-time calibration of excitation ranging, according to some embodiments. In this example, the wellbore to be drilled is parallel to a target well. In other embodiments the drilling wellbore may not be in parallel, but at a predetermined distance apart from the target wellbore guided by real-time ranging, described herein. In FIG. 1, a wellbore drilling system 100 that uses real-time calibration of excitation ranging comprises a target wellbore 10 that extends from a target wellhead 11 into a subterranean formation 12 from the surface 13 of the formation. Inside at least a portion of the length of the target wellbore 10 is a conductive casing 14 where path for current flow is placed along the length of the target wellbore 10 and radiates a magnetic field radially outward all along the target wellbore 10. In some embodiments, the target wellbore 10 may include a vertical section 16 and a directional section 18 where the directional section 18 is drilled from the vertical section 16 along a desired azimuthal path and a desired inclination path.

An electrical current 34a is provided to the target wellbore 10 by a power supply 40 at the surface 13 and is conveyed to the casing 14 of the target wellbore 10 through an insulated cable 38. A portion of the electrical current 34a from the power supply 40 will leak into formation 12 as shown by current lines 34b but most of current 34a will travel along the casing 14 creating EM field 36 that emanates from along the length of the casing 14. The power supply 40 is connected to a grounding well 49 by an insulated cable 43 to fulfill impedance criteria or ranging performance criteria. In some embodiments, the grounding wellbore 48 may be a grounding stake, and either may be further beneath the surface 13 into the subterranean formation 12. The power supply 40 may control the voltage and current output from the power supply 40 to control the EM field 36 generated.

A drilling wellbore 28 is in the process of being drilled, where a drilling platform 33 is positioned over the subterranean formation 12 and controls the bottom-hole-assembly (BHA) 52 of the drilling rig through a conveyance 48 within the drilling wellbore 28. The conveyance 48 may be tubing, a pipe string such as a drill string, or a cable, such as a wireline, slickline or the like, depending on the operation being conducted within the drilling wellbore 28 and is capable of telemetry to receive instructions and send measurements from the BHA 52. The BHA 52 includes an EM sensor 51, a drill bit 54, a power supply 56, a steering controller 58, a controller 60, and other instrumentation 62. The EM sensor 51 can receive the EM field 36 signal measurements. The steering controller 58 enables the drilling wellbore 28 to be extended in a desired direction. Many suitable steering mechanisms such as steering vanes, "bent sub" assemblies, and rotary steerable systems may be used.

The drilling wellbore 28 can be drilled along a desired path 32 that is parallel to the wellbore or in another configuration conforming to the pre-well plan and can be guided by real-time calibration of excitation ranging. An interface 50 receives measurements from the EM sensor 51 and conveys the measurements to a computer 20 to perform the real-time calibration of excitation ranging. In some embodiments, the surface interface 50 and the computer 20 may perform various operations such as converting signals from one format to another, storing measurements, processing measurements, generating ranging models, and performing inversion methods. The computer 20 can include a processor 22 to perform these operations as wellbore as determining the distance and direction information from the EM field 36 measurements by the EM sensor 51. The computer 20 also may include input devices such as keyboard, mouse, touchpad, etc. and output devices 24 such as a monitor, printer, etc. Such input device 26 and output device 24 provides a user interface that enables an operator to halt drilling, resume drilling, and update the desired path 32 to control the direction of drilling.

Example Operations

Figure 2:
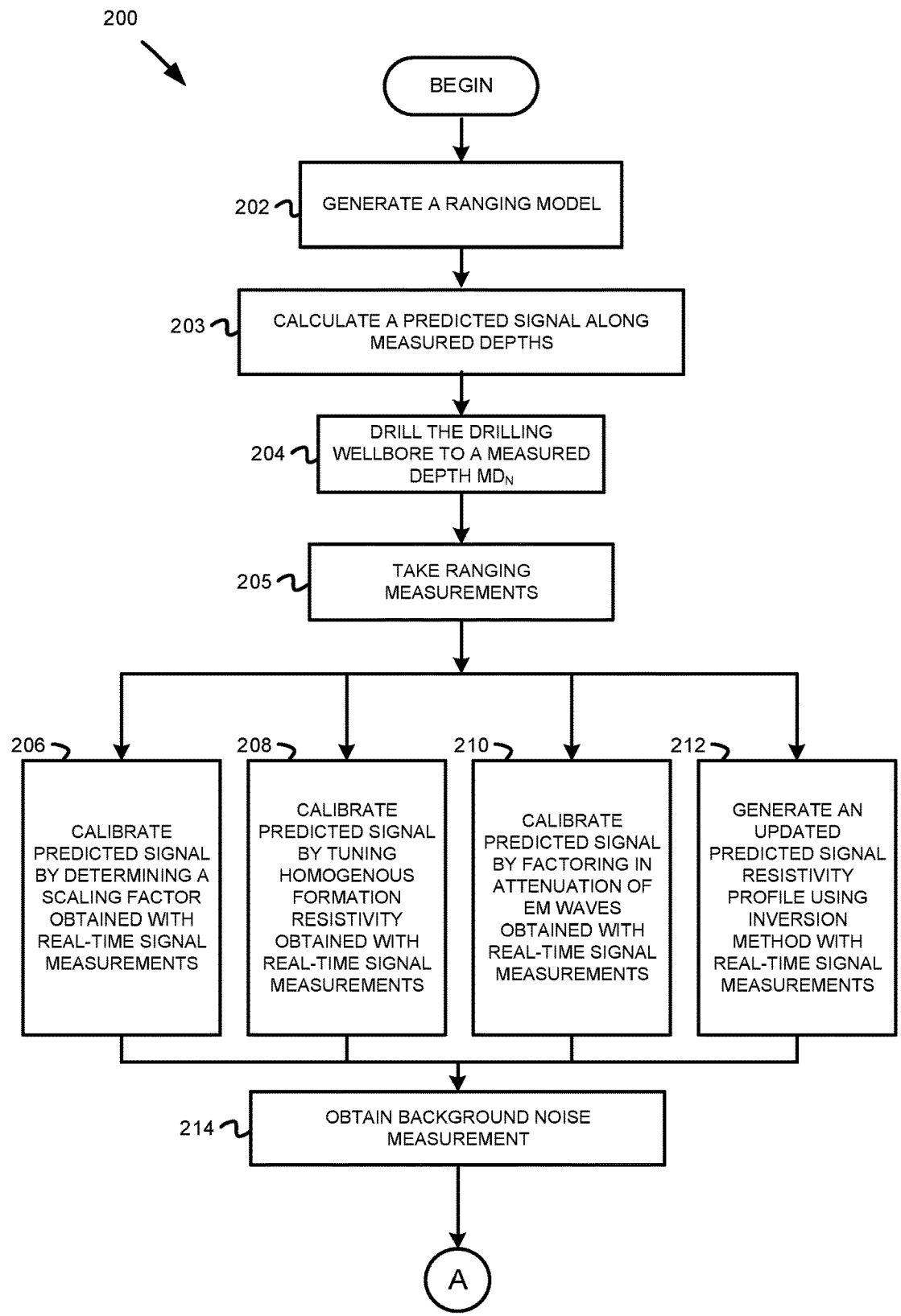
FIGS. 2-3 depicts a flowchart of operations for real-time calibration of excitation ranging, according to some embodiments.
Figure 3:
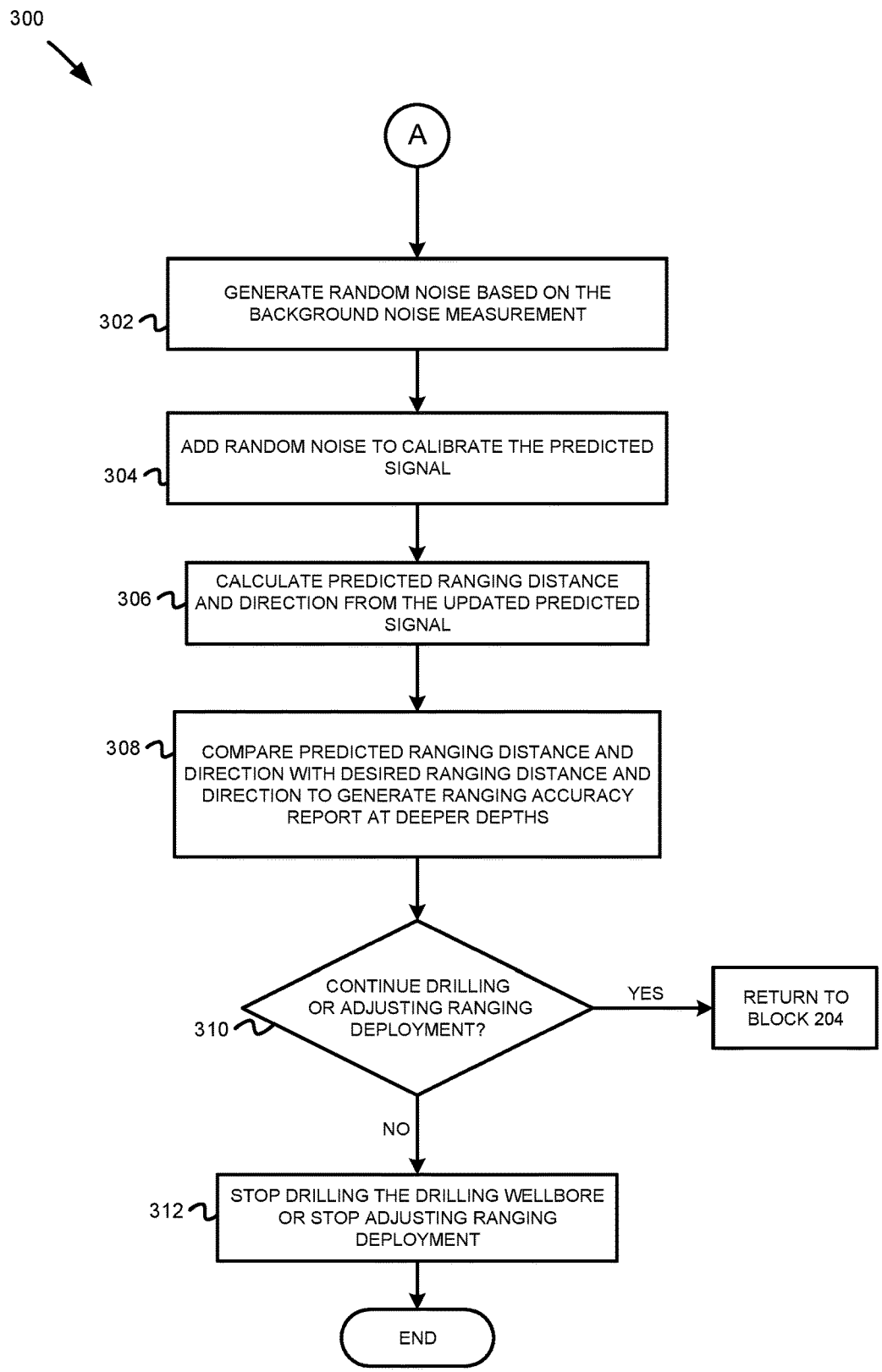

FIGS. 2-3 depicts a flowchart of operations for real-time calibration of excitation ranging, according to some embodiments. Flowcharts 200 and 300 of FIGS. 2-3 include operations that can be performed by hardware, software, firmware, or a combination thereof. For example, at least some of the operations can be performed by a processor executing program code or instructions. In some embodiments, such operations can be performed in a computer at the surface or downhole.

Figure 4:
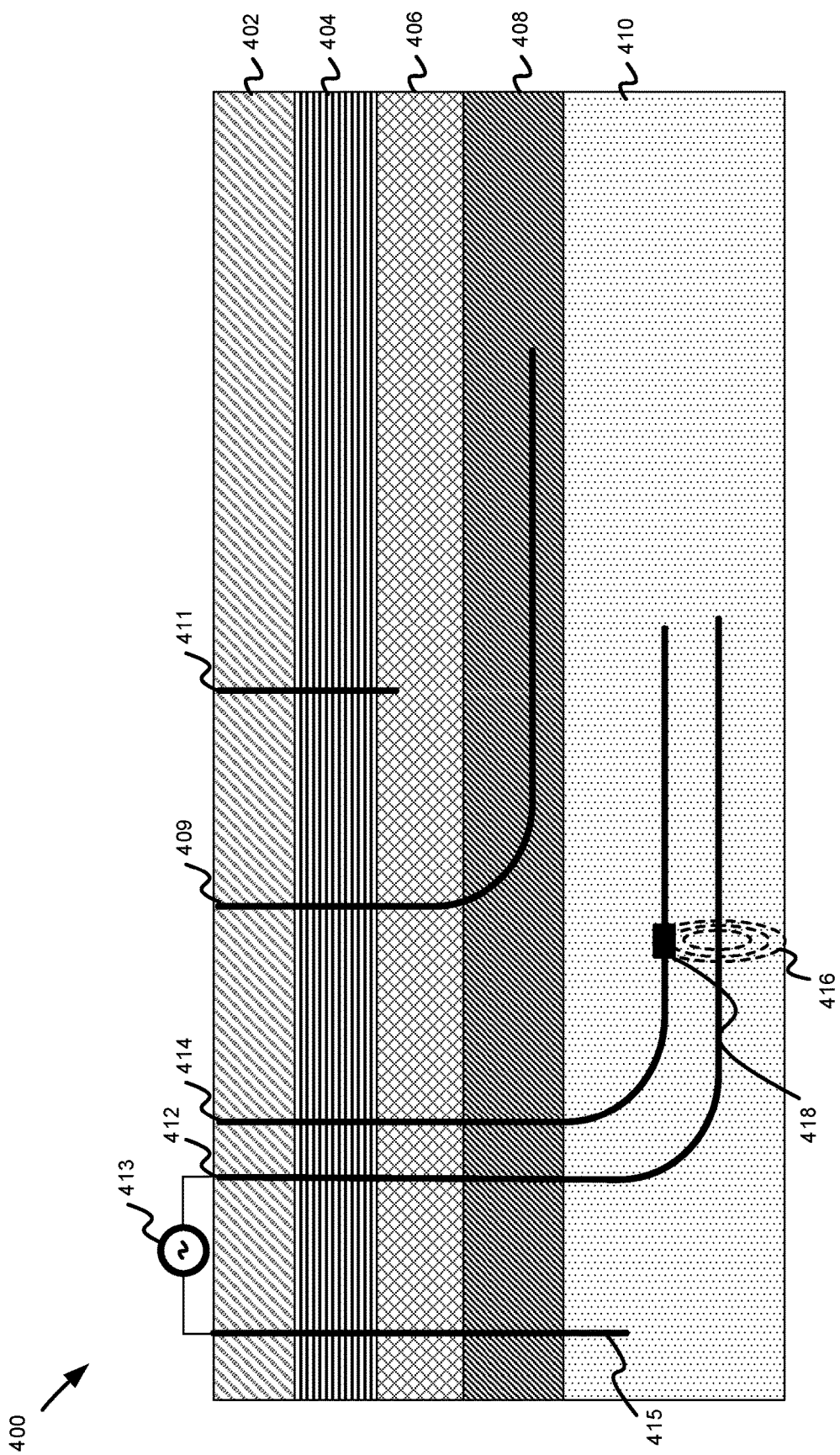
FIG. 4 depicts an example ranging model of a sample wellbore system with multiple formation layers.

At block 202, a ranging model of the target wellbore is generated. For example, with reference to FIG. 1, a ranging model is generated for the target wellbore 10 to calculate the predicted EM field 36 signal, $H_0(MD)$, along the length of the casing 14 where MD refers to the measured depth of the subterranean formation 12. The model can be generated using legacy resistivity profile data obtained during different stages in the lifetime of the wellbore including surveying, planning, drilling, and operating stages of the target well. With reference to FIG. 1, the target wellbore 10 information such as resistivity profile data, current and voltage measurements from power supply 40 at the wellhead, and material properties of the target wellbore casing 14 can be used in a numerical method (either 1D or 3D) to simulate a ranging model. The ranging model can include the magnetic field $H_0(MD)$ signal expected to be received along the measured depth, MD, from which the ranging distance $Dis_0(MD)$ and direction $Dir_0(MD)$ can further be calculated from the magnetic field. Additionally, ranging accuracy can be determined by comparing the desired distance and direction. For example, FIG. 4 depicts an example ranging model of a sample wellbore system with multiple formation layers. In particular, FIG. 4 illustrates a ranging model 400 that is composed of various formation layers such as clay 402, water 404, shale 406, sand 408, reservoir 410, etc. of various formation resistivities, $R_{clay\ or\ water\ or\ shale,\ etc.}$. The ranging model 400 includes surrounding wellbores 409 and 411, a target wellbore 412 that is connected to a power supply 413, and a ground stake or grounding wellbore 415 and a sensor 418 inside the drilling wellbore 414 that can detect the electromagnetic field 416 along the target well.

Figure 5:
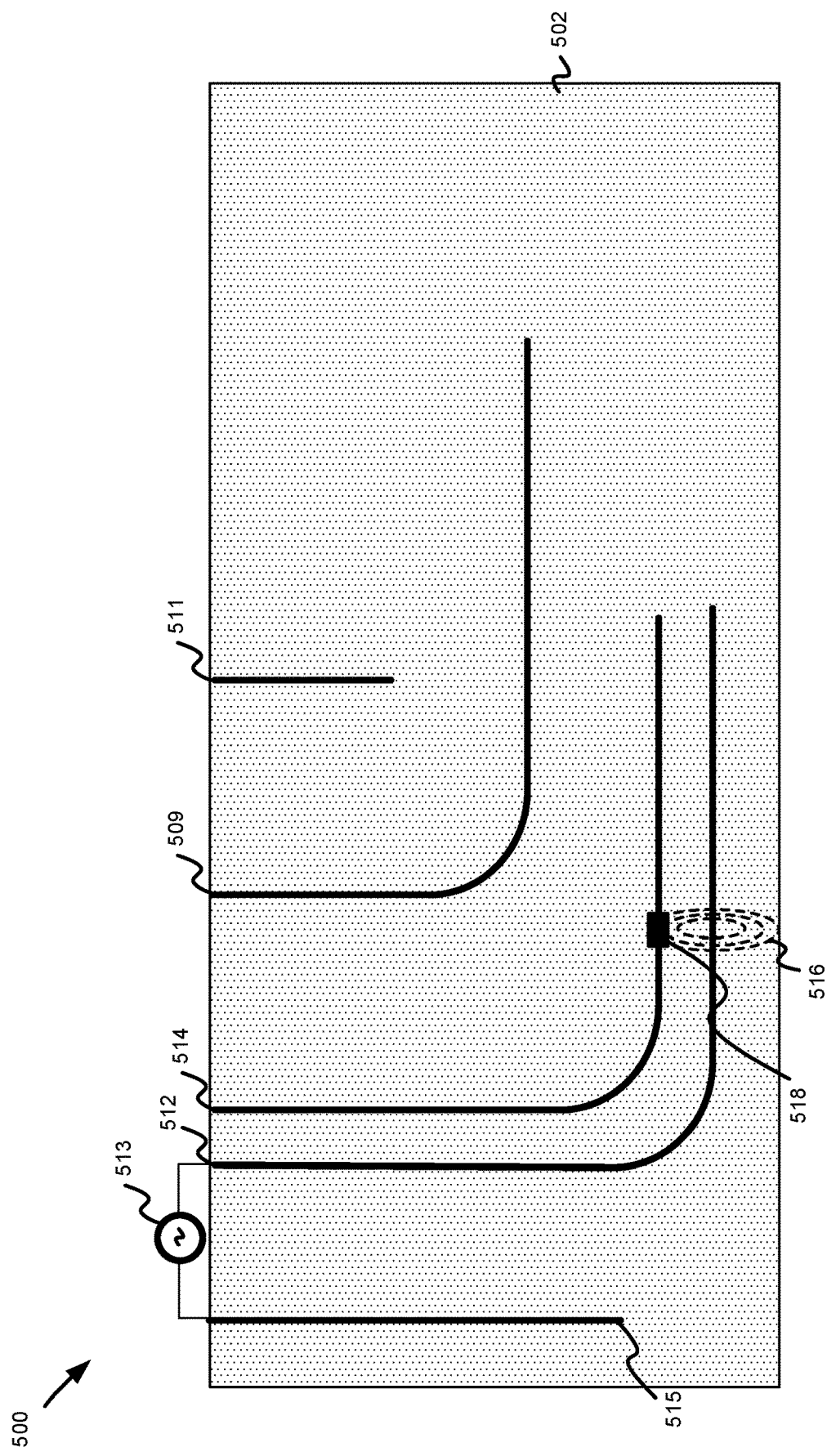
FIG. 5 depicts an example simplified ranging model of a sample wellbore system with a single homogeneous formation layer of estimated average formation resistivity.

In some embodiments, this ranging model may further be transformed into a simplified ranging model with a single homogeneous formation layer with an estimated average formation resistivity, $R_0$. To illustrate, FIG. 5 depicts an example simplified ranging model of a sample wellbore system with a single homogeneous formation layer of estimated average formation resistivity. In particular, FIG. 5 illustrates a simplified ranging model 500 that is composed of a single homogeneous formation layer 502 with an estimated average formation resistivity, R. The simplified ranging model 500 includes surrounding wellbores 509 and 511, a target wellbore 512 that is connected to a power supply 513, and a ground stake or grounding wellbore 515 and a sensor 518 inside the drilling wellbore 514 that can detect the electromagnetic field 516 along the target well.

At block 203, a predicted signal along measured depths is calculated. The predicted signal can be calculated based on the generated ranging model. For example, with reference to FIG. 1, either simplified or non-simplified models of the wellbore drilling system 100 may be used to calculates a predicted EM field 36 value, $H_0(MD)$, generated around the target wellbore casing 14 that would be received by the EM sensor 51 along the measured depth of the drilling well 28.

At block 204, the drilling wellbore is drilled to a measured depth $MD_N$. With reference to FIG. 1, the drilling is performed along a predetermined desired path 32 navigable using the EM sensor 51 and the EM field 36 generated around the casing 14. Drilling may be stopped at any measured depth of logging point N, or $MD_N$.

At block 205, ranging measurements are taken. Measurements such as the EM field, $H(MD_N)$ can be taken by the EM sensor in real-time. For example, with reference to FIG. 1, the EM sensor 51 attached to the BHA 52 or other parts of the conveyance 48 may be used to obtain the EM field 36 signal. This real-time data is then used to improve the accuracy of the predicted signal.

Different operations for calibrating the predicted signal are now described at blocks 206, 208, 210, and 212. One or more of these calibrations can be performed. For example, in some applications, the four different calibrations are performed on the predicted signal. In another example, only one of the calibrations are performed. In another example, any combination of two or three of these calibrations can be performed.

At block 206, the predicted signal is calibrated by determining a scaling factor obtained with real-time signal measurements. For example, with reference to FIG. 1, the equation for the scaling factor S, is given in Equation (1), where $H(MD_N)$ is the EM field 36 signal obtained by the EM sensor 51 at the measured depth, MD, of logging point N of the subterranean formation 12. $H_0\ (MD_N)$ is the predicted EM field signal at the measured depth of logging point N.

$$S=H(MD_N)/H_0(MD_N) \qquad (1)$$

The scaling factor is applied to the ranging model data to calibrate the predicted signal at different measured depths. Applying the scaling factor can correct the predicted signal error at deeper depths more significantly than signal error at shallower depths.

At block 208, the predicted signal is calibrated by tuning homogeneous formation resistivity obtained with real-time signal measurements. For example, with reference to FIG. 1, the resistivity for simplified ranging model of the subterranean formation 12 is updated from $R_0$ to $R_1$ which in turn is used to make the real-time EM field 36 value, $H(MD_N)$, equal to the predicted magnetic field value, $H_0(MD)$, as shown below.

$$H(MD_N)=H_0(MD) \qquad (2)$$

The difference between the real-time EM field signal and the predicted EM field signal can be attributed to inaccuracies in the resistivity of the ranging model and corrected to a new resistivity value of $R_1$. Once $R_1$ is calculated, an updated predicted signal is obtained by recreating a ranging model with this new formation resistivity. For non-homogenized ranging models with multiple resistivity layers and resistivity values, the upper layer formation resistivity can be calibrated by assuming the same relationship given in Equation (2). Apart from the reservoir layer formation resistivity which cannot be calibrated, for other layers, the ranging model can be recreated and an updated predicted signal is generated at deeper depths.

At block 210, predicted signal is calibrated by factoring in attenuation of EM waves obtained with real-time signal measurements. For example, with reference to FIG. 1, the subterranean formation 12 resistivity values represented in the simplified ranging model by a homogeneous resistivity value is measured using two consecutive real-time measurements $H(MD_{N-1})$ and $H(MD_N)$. The attenuation of the EM wave in conductive formation is related to the formation resistivity RN according to Equations (3)-(4), where $\varepsilon$ is the permittivity, $\mu$ is the permeability, $\sigma$ is the conductivity, and $\omega$ is the wave frequency.

$$H(MD_N) = H(MD_{N-1})e^{-\beta \Delta MD} \qquad (3)$$

$$\beta = \omega\left(\frac{\mu\epsilon}{2}\left[\left(1 + \frac{\sigma^2}{\epsilon^2\omega^2}\right)^{\frac{1}{2}} - 1\right]\right)^{\frac{1}{2}} \quad (4)$$

In quasi-static regime where ε ω<<σ, Equation (4) is reduced to the following.

$$\beta = \omega\left(\frac{\mu\sigma\epsilon}{2}\right)^{\frac{1}{2}} = \sqrt{\frac{\mu\omega}{2R_N}} \quad (5)$$

Hence, the formation resistivity around MDN is shown by Equation (6)

$$R_N = \frac{\omega\mu}{2\left(\frac{\ln\left(\frac{H_{N-1}}{H_N}\right)}{\Delta MD}\right)} \quad (6)$$

By evaluating RN along measured depth in intervals, an updated resistivity profile is generated that is more accurate than the resistivity given in the legacy data-based profile. An updated predicted signal is obtained by recreating the ranging model with this new resistivity profile.

At block 212, an updated predicted signal resistivity profile is generated using inversion method with real-time signal measurements. For non-homogenized ranging models, the predicted signal is calibrated by calibrating the formation resistivities through generating an updated resistivity profile using inversion method using real-time signal measurements obtained in block 204. For example, with reference to FIG. 1, an inversion engine takes in all measurements taken by the EM sensor 51 at previous logging points (H(MD$_1$), H(MD$_2$), H(MD$_3$) . . . H(MD$_{N-1}$)) of the subterranean formation 12 to perform an inversion method and generates a more accurate ranging model of the wellbore drilling system 100. The inversion method may include generating reduced dimension approximation models, formulating a constrained nonlinear optimization problem, transforming the inverted parameters, and performing Jacobian matrix calculation. The inversion method is able to generate an updated resistivity profile that can be used to recreate an updated ranging model.

At block 214, background noise measurement is obtained. One or more noise measurements can be obtained through the EM field measurement with excitation on (where the power supply runs a current down the target wellbore) or with EM sensor measurement with excitation off (where the power supply would not run current down the target wellbore and thereby eliminate the EM field generated along the casing). For example, with reference to FIG. 1, background noise can be obtained by the EM sensor 51 or obtained from the EM ranging measurements at block 204. Thus, block 214 may be performed before blocks 206, 208, 210, and 212 or be performed concurrently. Operations of the flowchart 200 continue at transition point A, which continues at transition point A of the flowchart 300. From the transition point A of the flowchart 300, operations continue at block 302.

At block 302, random signal noise is generated based on the background noise measurements. The random noise can be generated by using the recording of the background noise measurement. It can also be generated by generating uniform or Gaussian distribution noise with the nominal value of the background noise.

At block 304, the random noise is added to calibrate the predicted signal. The predicted signal can be improved by adding a random noise signal to account for the effect that background noise would have on the predicted signal. The application of random noise updates the predicted signal which can be used to evaluate the signal-to-noise-ratio (SNR) of the ranging system. With reference to FIG. 1, the SNR can help to improve the prediction of the accuracy of the ranging measurements taken by the EM sensor 51 along the drilling wellbore 28. By accounting for the background noise that is inherent in subterranean formation 12, the accuracy of the predicted signal can be increased.

Figure 6:
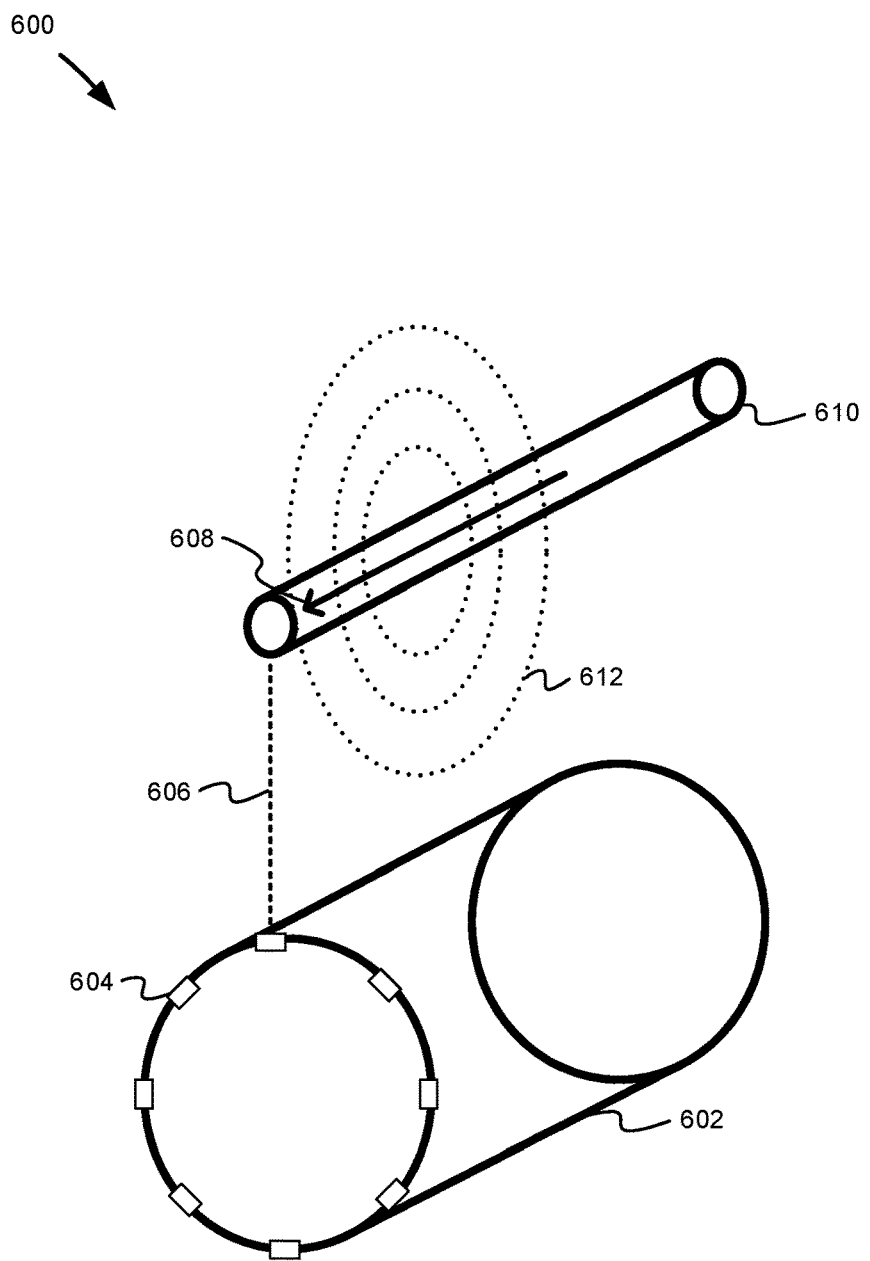
FIG. 6 depicts an example magnetometer and line source arrangement which a synthetic test that adds noise to EM field measurements will utilize, according to some embodiments.

FIG. 6 depicts an example magnetometer and line source arrangement which a synthetic test that adds noise to EM field measurements will utilize, according to some embodiments. FIG. 6 illustrates a sample magnetometer and line source arrangement 600 which a synthetic test that adds noise to EM field measurements will be based on. The magnetometer and line source arrangement 600 is composed of a drilling tool 602 with eight magnetometers 604 arranged azimuthally around the drilling tool 602. Ranging distance 606, voltage, electrical current 608 running through the line source 610, and EM field 612 generated by the electrical current 608 are variable that may be controlled in the synthetic test for noise. By imposing random noise with specific amplitudes (i.e. −5 pT, 0 pT, 5 pT, etc.) on the EM field 612, the ranging errors is determined.

Figure 7A:
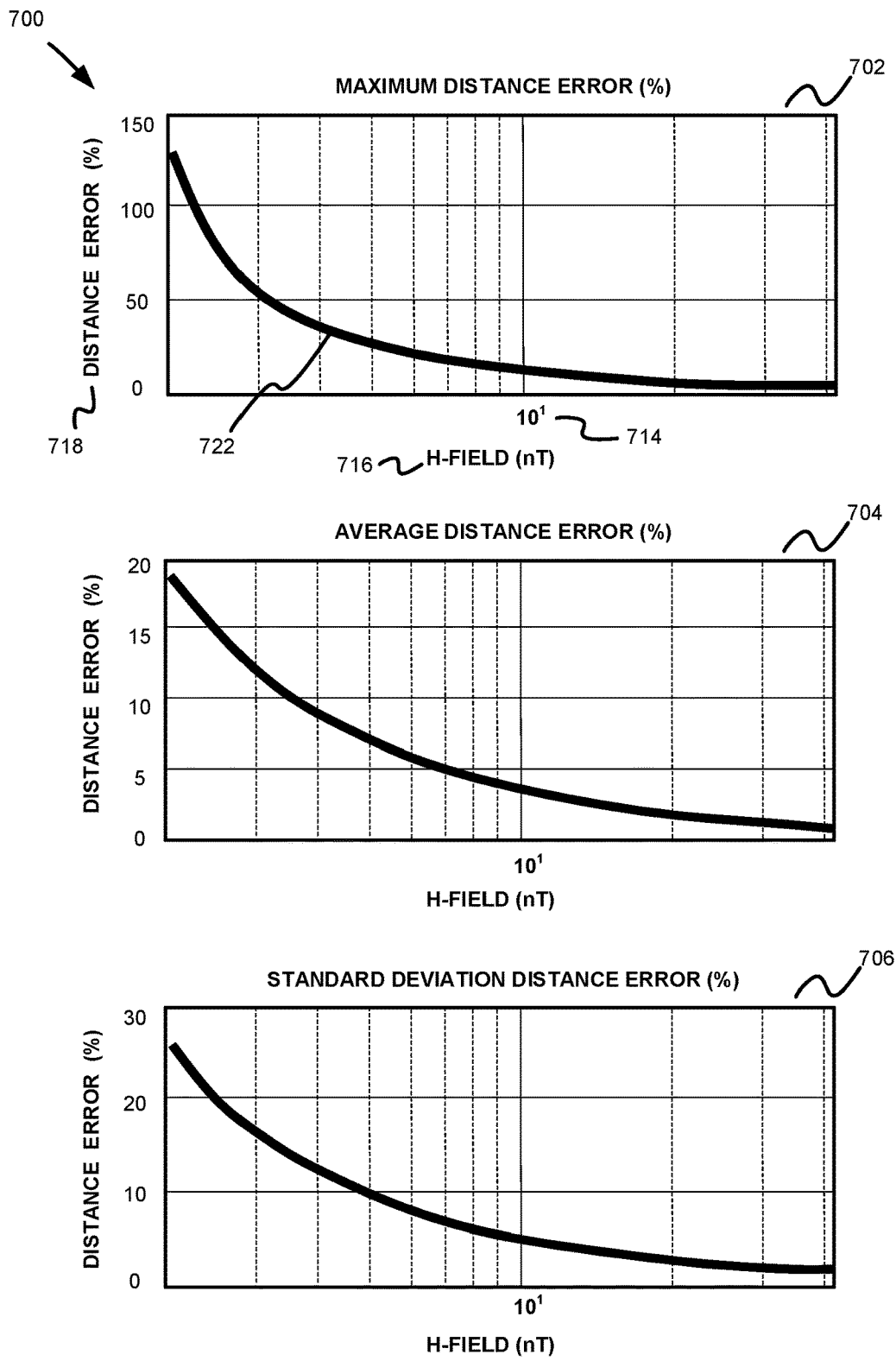
FIGS. 7A-7B depict sample graphs of a synthetic test that introduce random noise to magnetometer and line source arrangement with a distance value of five meters.
Figure 7B:
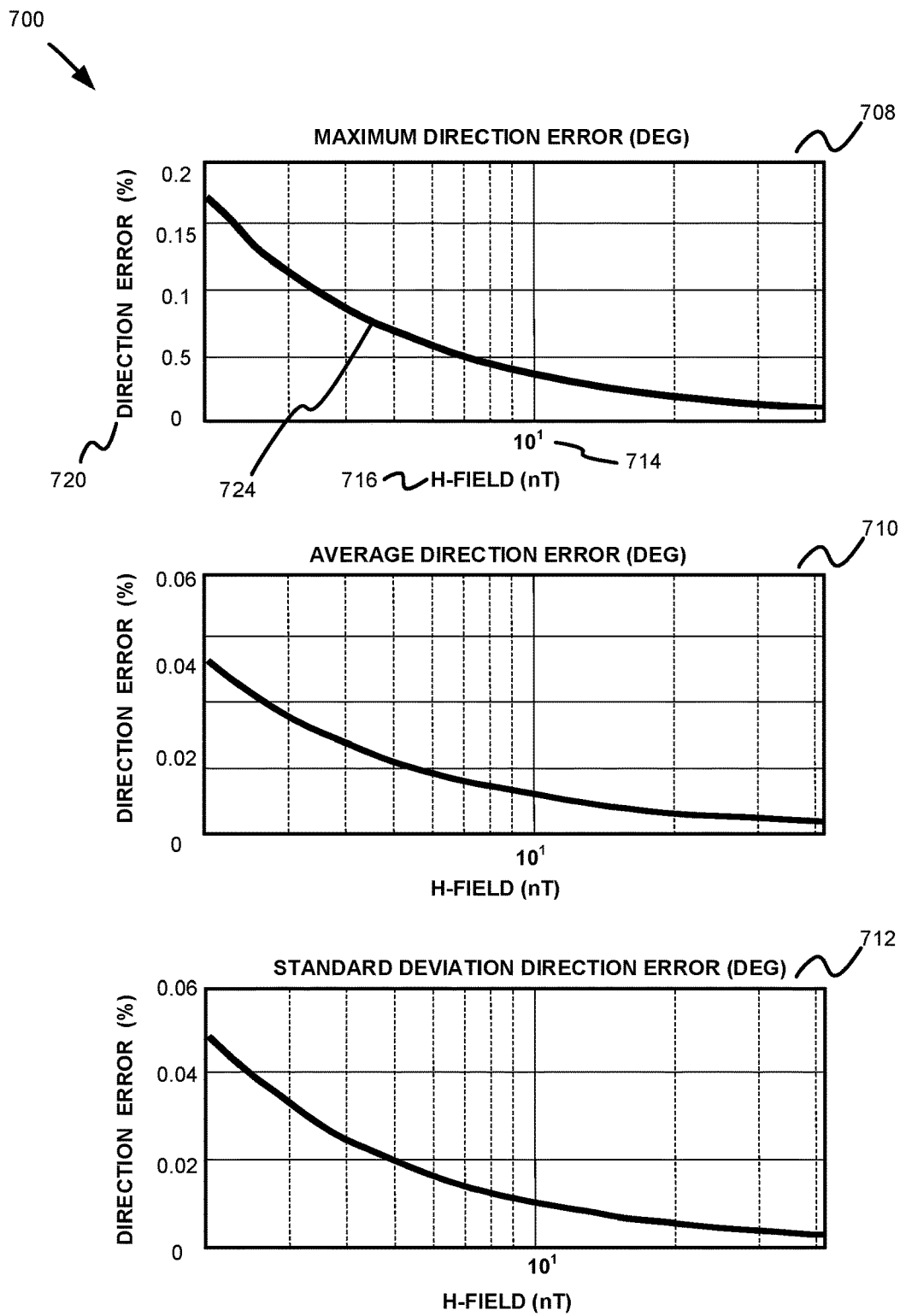

To illustrate, FIG. 7A-B depict sample graphs of a synthetic test that introduce random noise to magnetometer and line source arrangement with a distance value of five meters. FIGS. 7A and 7B depict sample graphs 700 of a synthetic test that introduce random noise to the EM field 612 of FIG. 6 and the resulting ranging errors. In graphs 700, ranging distance 606 is set to 5 meters (m), azimuthal angle to 0°, and random noise amplitude to 5 pT. Graphs in FIG. 7A depict errors related to distance that are introduced such as maximum distance error 702, average distance error 704, and standard deviation of distance error 706 on the measurements obtained by the eight magnetometers 604. Graphs in FIG. 7B depict errors related to direction such as maximum direction error 708, average direction error 710, and standard deviation of direction error 712 on the measurements obtained by the eight magnetometers 604. The x-axis of all of the graphs 700 is the EM field 612 (labeled in the graphs, H-field 716) generated by the line source 610 in logarithmic scale 714. The y-axis of graphs in FIG. 7A is the distance error 718 in percent and the y-axis of graphs in FIG. 7B is the direction error in percent 720. Distance error lines 722 and direction error lines 724 describe the relationship between the error and the EM field 612 strength.

Figure 8A:
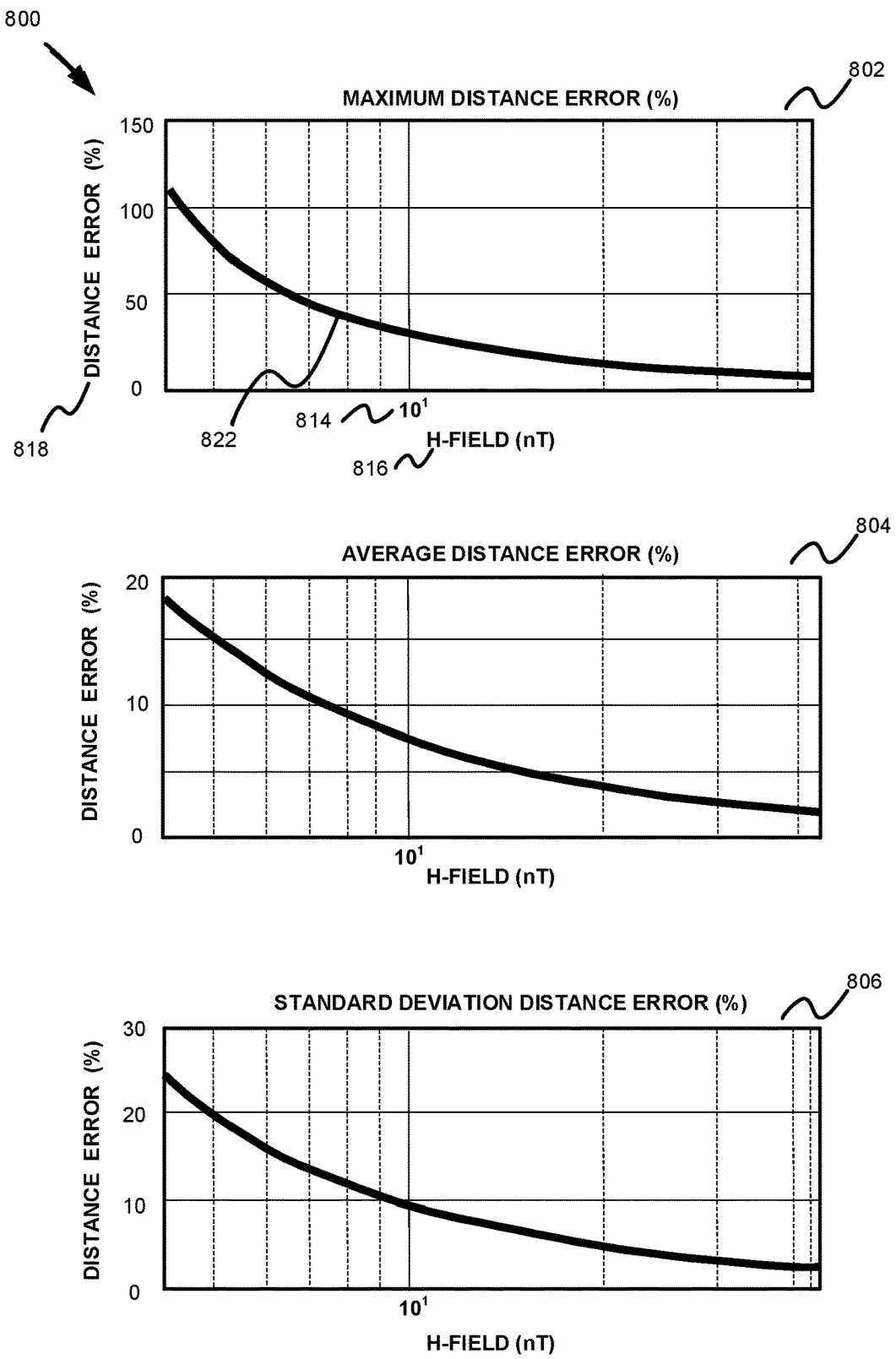
FIGS. 8A-8B depict sample graphs of a synthetic test that introduce random noise to magnetometer and line source arrangement with a distance value of 10 meters.
Figure 8B:
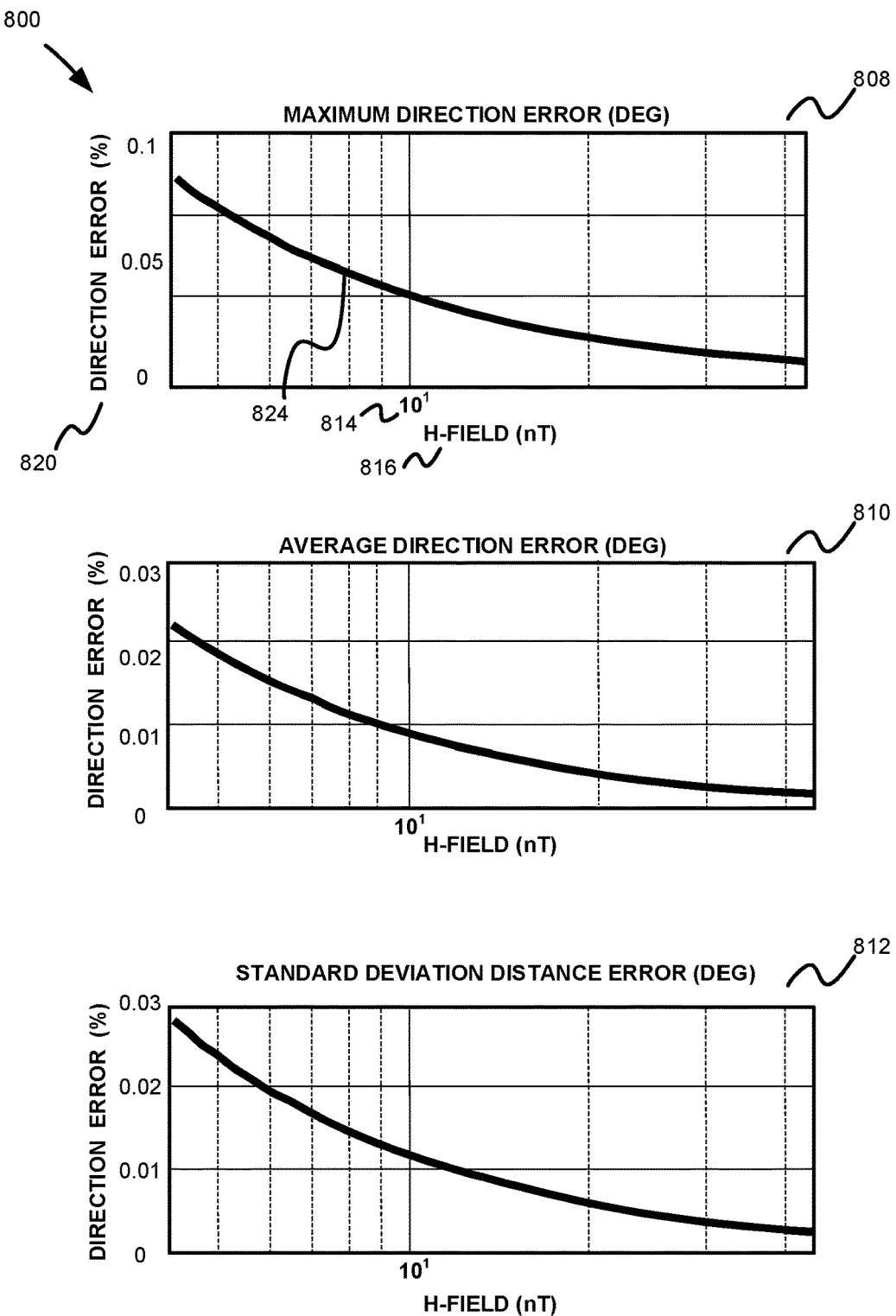

FIGS. 8A-8B depict sample graphs of a synthetic test that introduce random noise to magnetometer and line source arrangement with a distance value of 10 meters. FIGS. 8A-8B illustrate sample graphs 800 of a synthetic test that introduce random noise similar to FIGS. 7A-7B but with a different distance value. In graphs 800, ranging distance 606 is set to 10 m, azimuthal angle to 0°, and random noise amplitude to 5 pT. Graphs in FIG. 8A depict errors related to distance that are introduced such as maximum distance error 802, average distance error 804, and standard deviation of distance error 806 on the measurements obtained by the eight magnetometers 604. Graphs in FIG. 8B depict errors related to direction such as maximum direction error 808, average direction error 810, and standard deviation of direction error 812 on the measurements obtained by the eight magnetometers 604. The x-axis of all of the graphs 800 is the EM field 612 (labeled in the graphs, H-field 816) generated by the line source 610 in nT in logarithmic scale 814. The y-axis of graphs in FIG. 8A is the distance error 818 in percent and the y-axis of graphs in FIG. 8B is the direction error in percent 820. Distance error lines 822 and direction error lines 824 describe the relationship between the error and the EM field 612 strength.

Figure 9:
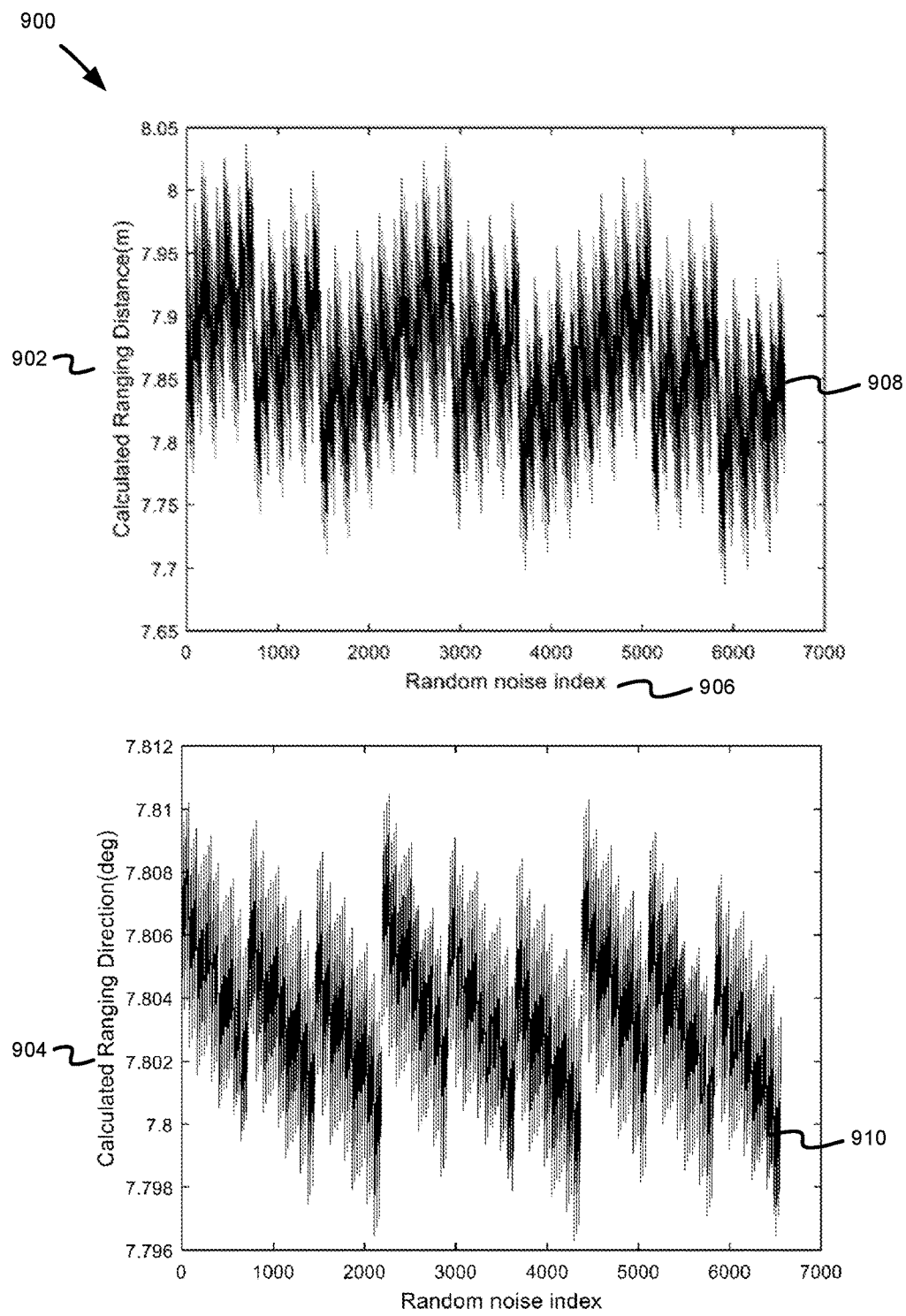
FIG. 9 depicts sample graphs of calculated ranging distance and ranging direction with random noise injected into the ranging EM field measurement.

In an alternate embodiment, background noise with different grounding or excitation levels than the predicted signal may be used to calibrate the predicted signal. The background noise used can be a random noise study, such as a Monte Carlo study, at a particular depth and can further be used to statistically evaluate the accuracy of the predicted signal. By using statistical analysis, the variations of the ranging distance and direction that was calculated based on the noise-injected EM field measurements can be evaluated and the accuracy of the ranging distance and direction at the measured depth be determined. To illustrate, FIG. 9 depicts sample graphs of calculated ranging distance and ranging direction with random noise injected into the ranging EM field measurement. FIG. 9 depicts sample graphs 900 of calculated ranging distance 902 and ranging direction 904 with random noise from a Monte Carlo study within ±5 pT injected into the ranging EM field measurement. As the random noise index 906 increases, its effect is reflected by the changes in the ranging distance line 908 and ranging direction line 910. By measuring the variations in these lines 908 and 910, accuracy of the ranging distance and direction at a measured depth, MD, is determined.

Returning to the operations of the flowchart 300 of FIG. 3, at block 306, the predicted ranging distance and direction is calculated from the updated predicted signal. The predicted ranging distance Dis(MD) and direction Dir(MD) can be calculated from the updated magnetic field $H(MD_N)$ by decomposing the field into direction and magnitude.

At block 308, the predicted ranging distance and direction is compared with desired ranging distance and direction to generate a ranging accuracy report at deeper depths. For example, the Dis(MD) and direction Dir(MD) determined at block 306 is compared to $Dis_0(MD)$ and direction $Dir_0(MD)$ obtained at block 203. With reference to FIG. 1, the ranging accuracy report can communicate a range of uncertainty of the predicted EM field and accuracy of the EM field 36 to be measured by the EM sensor 51 as it travels down deeper depths.

At block 310, a determination is made of whether to continue drilling or to adjust ranging deployment. This determination can be made based on the ranging accuracy predicted at $MD_N$. For example, with reference to FIG. 1, if the decision to continue drilling or adjusting ranging deployment is made, the drilling wellbore 28 is taken further down the desired path 32 to the next measured depth and repeats the ranging calibration process. Furthermore, drilling conditions such as excitation or grounding may be adjusted based on this ranging. If the determination is made to continue drilling or adjusting ranging deployment, operations continue at transition point B, which continues at transition point B of the flowchart 200 (at block 204). Otherwise, operations continue at block 312.

At block 312, drilling of the drilling wellbore is stopped or the adjusting the ranging deployment is stopped. The operations for real-time calibration of excitation ranging ceases. For example, with reference to FIG. 1, the BHA 52 may continue to use the updated ranging model along with BHA 52 includes an EM sensor 51, a drill bit 54, a power supply 56, a steering controller 58, a controller 60, and other instrumentation 62 to extend the drilling wellbore 28 in a desired path 32, but no further adjustment of ranging deployment is made.

Example Computer Device

Figure 10:
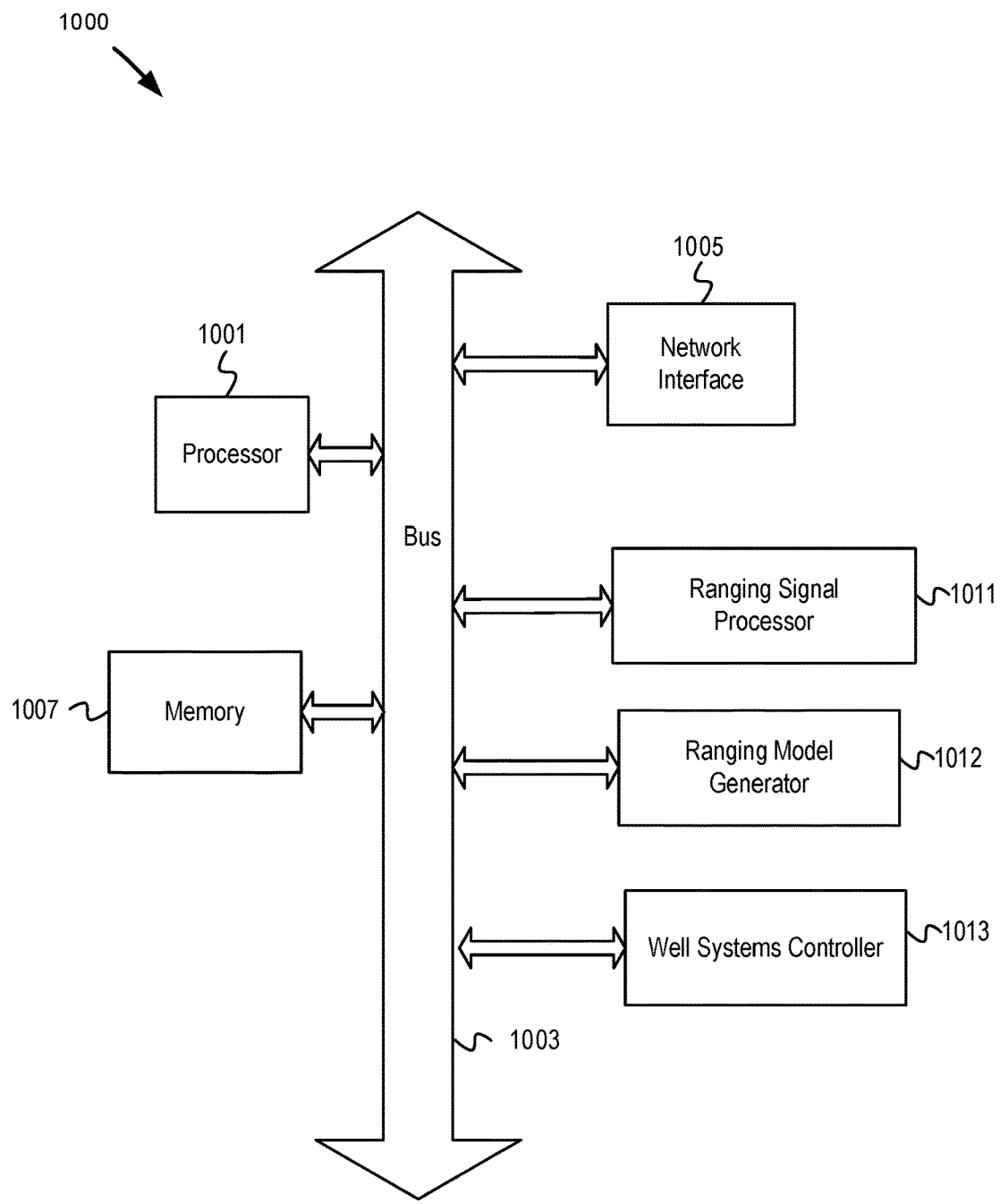
FIG. 10 depicts an example computer, according to some embodiments.

FIG. 10 depicts an example computer, according to some embodiments. A computer device 1000 includes a processor 1001 (possibly including multiple processors, multiple cores, multiple nodes, and/or implementing multi-threading, etc.). The computer device 1000 includes a memory 1007. The memory 1007 can be system memory or any one or more of the above already described possible realizations of machine-readable media. The computer device 1000 also includes a bus 1003 and a network interface 1005 (e.g., a Fiber Channel interface, an Ethernet interface, an internet small computer system interface, synchronous optical network (SONET) interface, wireless interface, etc.).

The computer device 1000 includes a ranging signal processor 1011 and ranging model generator 1012. In some cases, the computer device 1000 also includes a wellbore system controller 1013. The ranging signal processor 1011 calculates the predicted EM field signal and the resistivity of the subterranean formations. With reference to FIG. 1, to calculate the predicted EM field signal and the formation resistivities, the ranging signal processor 1011 can use legacy formation data, existing ranging models, electrical current and voltage data from the power supply 40, and the EM sensor 51 data obtained real-time (including noise) from the BHA 52 of the drilling well 28. The ranging signal processor 1011 moreover can calculate the ranging distance and direction from predicted signal. The ranging model generator 1012 can create a ranging model that simulates the various wellbore layout, formation layers and its resistivities, expected EM field signal, and the desired drilling wellbore path. The ranging model generator 1012 can generate a ranging accuracy report at a measured depth as part of the ranging model in conjunction with the ranging signal processor 1011. The wellbore system controller 1013 can also perform one or more operations for controlling a wellbore drilling system. For example, the wellbore system controller 1013 can determine the voltage and current generated by the power supply into the target wellbore casing, modify the direction of drill bit, modify the speed of a drilling rig being lowered into a drilling well, control the EM sensor, etc. Any one of the previously described functionalities can be partially (or entirely) implemented in hardware and/or on the processor 1001. For example, the functionality can be implemented with an application specific integrated circuit, in logic implemented in the processor 1001, in a co-processor on a peripheral device or card, etc. Further, realizations can include fewer or additional components not illustrated in FIG. 10 (e.g., video cards, audio cards, additional network interfaces, peripheral devices, etc.). The processor 1001 and the network interface 1005 are coupled to the bus 1003. Although illustrated as being coupled to the bus 1003, the memory 1007 can be coupled to the processor 1001. The computer device 1000 can be integrated into component(s) of the drilling rig downhole and/or be a separate device at the surface that is communicatively coupled to the coring tool for controlling and processing signals (as described herein).

Accordingly, aspects of the system, method or program code/instructions stored in one or more machine-readable media can take the form of hardware, software (including firmware, resident software, micro-code, etc.), or a combination of software and hardware aspects that can all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) can be utilized. The machine-readable medium can be a machine-readable signal medium or a machine-readable storage medium. A machine-readable storage medium can be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium can be any tangible medium that can contain or store a program for use by or in connection with an instruction execution system, apparatus, or device. A machine-readable storage medium is not a machine-readable signal medium.

A machine-readable signal medium can include a propagated data signal with machine readable program code embodied therein, for example, in baseband or as part of a carrier wave. Such a propagated signal can take any of a variety of forms, including, but not limited to, electromagnetic, optical, or any suitable combination thereof. A machine-readable signal medium can be any machine readable medium that is not a machine-readable storage medium and that can communicate, propagate, or transport a program for use by or in connection with an instruction execution system, apparatus, or device.

Program code embodied on a machine-readable medium can be transmitted using any appropriate medium, including but not limited to wireless, wireline, optical fiber cable, RF, etc., or any suitable combination of the foregoing.

Computer program code for carrying out operations for aspects of the disclosure can be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code can execute entirely on a stand-alone machine, can execute in a distributed manner across multiple machines, and can execute on one machine while providing results and or accepting input on another machine.

The program code/instructions can also be stored in a machine-readable medium that can direct a machine to function in a particular manner, such that the instructions stored in the machine-readable medium produce an article of manufacture including instructions which implement the function/act specified in the flowchart and/or block diagram block or blocks.

As used herein, the term "or" is inclusive unless otherwise explicitly noted. Thus, the phrase "at least one of A, B, or C" is satisfied by any element from the set {A, B, C} or any combination thereof, including multiples of any element.

Example Embodiments

Example embodiments include the following:

Embodiment 1: A method comprising: generating a ranging model of a ranging system that includes a drilling wellbore to be drilled; generating a predicted signal along measured depths of the drilling wellbore based on the ranging model; performing the following operations until the drilling wellbore has been drilled to a defined depth, drilling, with a drill string, the drilling wellbore to an increment of the defined depth; detecting, by a sensor positioned on the drill string, an electromagnetic field emanating from a target wellbore; determining ranging measurements to the target wellbore at the increment of the defined depth based on the electromagnetic field; calibrating the predicted signal for deeper depths in the wellbore based on the real-time ranging measurements; determining ranging accuracy for deeper depths; and modifying the drilling of the drilling wellbore or adjusting drilling operations based on the predicted ranging accuracy for deeper depths.

Embodiment 2: The method of Embodiment 1, wherein performing the following operations comprises: detecting a real-time ranging signal in the drilling wellbore with excitation on; detecting a background noise in the drilling wellbore with excitation off; and generating a random noise based on the background noise, wherein calibrating the predicted signal comprise calibrating the predicted signal based on the real-time ranging signal and adding the random noise to the calibrated predicted signal.

Embodiment 3: The method of Embodiments 1 or 2, wherein performing the following operations comprises: comparing calculated ranging distance and direction from the calibrated predicted signal to an intended distance and an intended direction at deeper depths, wherein modifying the drilling of the drilling wellbore or adjusting drilling operations comprises increasing an excitation signal or changing a grounding option or stopping the drilling if the calibrated predicted signal is lower than a requirement.

Embodiment 4: The method of any one of Embodiments 1-3, wherein calibrating the predicted signal comprises: determining a scaling factor based on the ranging measurements; applying the scaling factor to the ranging model to create an updated ranging model; and calibrate the predicted signal based on the updated ranging model.

Embodiment 5: The method of any one of Embodiments 1-3, wherein calibrating the predicted signal comprises: creating a simplified ranging model; improving, based on the ranging measurements, the simplified ranging model having a homogenous formation resistivity; updating the homogeneous formation resistivity based on the ranging measurements; and calibrating the predicted signal based on the updated homogeneous formation resistivity.

Embodiment 6: The method of any one of Embodiments 1-3, wherein calibrating the predicted signal comprises: determining attenuation of the electromagnetic field from two ranging measurements; updating the ranging model based on the attenuation; and calibrating the predicted signal based on the updated ranging model.

Embodiment 7: The method of any one of Embodiments 1-3, wherein calibrating the predicted signal comprises: generating an updated resistivity profile based on an inversion of the ranging measurements; updating the ranging model based on the updated resistivity profile; and calibrating the predicted signal based on the updated ranging model.

Embodiment 8: A system comprising: a drill string having a drill bit to drill a drilling wellbore, the drill string having a sensor; a processor; and a machine-readable medium having instructions stored thereon that are executable by the processor to cause the processor to, generate a ranging model of the drilling wellbore to be drilled; generate a predicted signal along measured depths of the drilling wellbore based on the ranging model; perform the following operations at an increment of a defined depth at which the drilling wellbore is to be drilled until the drilling wellbore has been drilled to the defined depth, detect, by the sensor, an electromagnetic field emanating from a target wellbore; determine ranging measurements to the target wellbore at the increment of the defined depth based on the electromagnetic field; calibrate the predicted signal based on the ranging measurements; determining ranging accuracy for deeper depths in the wellbore; and modifying the drilling of the drilling wellbore or adjusting drilling operations based on the predicted ranging accuracy for deeper depths.

Embodiment 9: The system of Embodiment 8, wherein the instructions executable by the processor to cause the processor to perform the following operations comprises instructions executable by the processor to cause the processor to: detect a real-time ranging signal in the drilling wellbore with excitation on; detect a background noise in the drilling wellbore with excitation off; and generate a random noise based on the background noise, wherein the instructions executable by the processor to cause to the processor to calibrate the predicted signal comprise instructions executable by the processor to cause to the processor to calibrate the predicted signal based on the real-time ranging signal and random noise.

Embodiment 10: The system of Embodiments 8 or 9, wherein the instructions executable by the processor to cause the processor to perform the following operations comprises instructions executable by the processor to cause the processor to: compare the calculated ranging distance and direction from calibrated predicted signal to an intended distance and an intended direction at deeper depths, wherein modifying the drilling of the drilling wellbore or adjusting drilling operations comprises increasing an excitation signal or changing a grounding option or stopping the drilling if the calibrated predicted signal is lower than a requirement.

Embodiment 11: The system of any one of Embodiments 8-10, wherein the instructions executable by the processor to cause the processor to calibrate the predicted signal comprises instructions executable by the processor to cause the processor to: determine a scaling factor based on the ranging measurements; apply the scaling factor to the ranging model to create an updated ranging model; and calibrate the predicted signal based on the updated ranging model.

Embodiment 12: The system of any one of Embodiments 8-10, wherein the instructions executable by the processor to cause the processor to calibrate the predicted signal comprises instructions executable by the processor to cause the processor to: create a simplified ranging model; improve, based on the ranging measurements, a simplified ranging model having a homogenous formation resistivity; update the homogeneous formation resistivity based on the ranging measurements; and calibrate the predicted signal based on the updated homogeneous formation resistivity.

Embodiment 13: The system of any one of Embodiments 8-10, wherein the instructions executable by the processor to cause the processor to calibrate the predicted signal comprises instructions executable by the processor to cause the processor to: determine attenuation of the electromagnetic field from two ranging measurements; update the ranging model based on the attenuation; and calibrate the predicted signal based on the updated ranging model.

Embodiment 14: The system of any one of Embodiments 8-10, wherein the instructions executable by the processor to cause the processor to calibrate the predicted signal comprises instructions executable by the processor to cause the processor to: generate an updated resistivity profile based on an inversion of the ranging measurements; update the ranging model based on the updated resistivity profile; and calibrate the predicted signal based on the updated ranging model.

Embodiment 15: One or more non-transitory machine-readable media comprising instructions executable by a processor to cause the processor to: generate a ranging model of a drilling wellbore to be drilled by a drill string; generate a predicted signal along measured depths of the drilling wellbore based on the ranging model; perform the following operations at an increment of a defined depth at which the drilling wellbore is to be drilled until the drilling wellbore has been drilled to the defined depth, detect, by a sensor positioned on the drill string, an electromagnetic field emanating from a target wellbore; determine ranging measurements to the target wellbore at the increment of the defined depth based on the electromagnetic field; calibrate the predicted signal based on the ranging measurements; and determining ranging accuracy for all deeper depths in the wellbore; and making drilling decisions or adjusting drilling operations (excitation, grounding) based on the predicted ranging accuracy for deeper depths.

Embodiment 16: The one or more non-transitory machine-readable media of Embodiment 15, wherein the instructions executable by the processor to cause to the processor to perform the following operations comprises instructions executable by the processor to cause the processor to: detect a real-time ranging signal in the drilling wellbore with excitation on; detect a background noise in the drilling wellbore with excitation off; and generate a random noise based on the background noise, wherein the instructions executable by the processor to cause to the processor to calibrate the predicted signal comprise instructions executable by the processor to cause to the processor to calibrate the predicted signal based on the real-time ranging signal and random noise.

Embodiment 17: The one or more non-transitory machine-readable media of Embodiment 15, wherein the instructions executable by the processor to cause to the processor to perform the following operations comprises instructions executable by the processor to cause the processor to: compare the calculated ranging distance and direction from calibrated predicted signal to an intended distance and an intended direction at deeper depths, wherein modifying the drilling of the drilling wellbore or adjusting drilling operations comprises increasing an excitation signal or changing a grounding option or stopping the drilling if the calibrated predicted signal is lower than a requirement.

Embodiment 18: The one or more non-transitory machine-readable media of any one of Embodiments 15-17, wherein the instructions executable by the processor to cause the processor to calibrate the predicted signal comprises instructions executable by the processor to cause to processor to: determine a scaling factor based on the ranging measurements; apply the scaling factor to the ranging model to create an updated ranging model; and calibrate the predicted signal based on the updated ranging model.

Embodiment 19: The one or more non-transitory machine-readable media of any one of Embodiments 15-17, wherein the instructions executable by the processor to cause the processor to calibrate the predicted signal comprises instructions executable by the processor to cause to processor to: create a simplified ranging model; improve, based on the ranging measurements, the simplified ranging model having a homogenous formation resistivity; update the homogeneous formation resistivity based on the ranging measurements; and calibrate the predicted signal based on the updated ranging model.

Embodiment 20: The one or more non-transitory machine-readable media of any one of Embodiments 15-17, wherein the instructions executable by the processor to cause the processor to calibrate the predicted signal comprises instructions executable by the processor to cause to processor to: determine attenuation of the electromagnetic field from two ranging measurements; update the ranging model based on the attenuation; and calibrate the predicted signal based on the updated ranging model.

What is claimed is:

1. A method comprising:
   simulating a ranging model of a ranging system that includes a drilling wellbore to be drilled, a target wellbore, and surrounding wellbores;
   simulating a predicted signal along measured depths of the drilling wellbore based on the ranging model;
   performing the following operations until the drilling wellbore has been drilled to a defined depth,
      drilling, with a drill string, the drilling wellbore to an increment of the defined depth;
      detecting, by a sensor positioned on the drill string, an electromagnetic field emanating from the target wellbore;
      determining ranging measurements to the target wellbore at the increment of the defined depth based on the electromagnetic field;
      recording at least one background noise measurement in the drilling wellbore;
      generating a random noise based on the at least one background noise measurement;
      calibrating the predicted signal for deeper depths in the wellbore based on the ranging measurements and the random noise, wherein the random noise is imposed on a the predicted signal;
      determining ranging accuracy for deeper depths based on the calibrated predicted signal; and
      modifying the drilling of the drilling wellbore or adjusting drilling operations based on the determined ranging accuracy for deeper depths.

2. The method of claim 1, wherein performing the following operations comprises:
   detecting a real-time ranging signal in the drilling wellbore with excitation on; and
   recording the at least one background noise measurement in the drilling wellbore with excitation off, wherein calibrating the predicted signal comprises calibrating the predicted signal based on the real-time ranging signal and adding the random noise to the calibrated predicted signal.

3. The method of claim 1, wherein performing the following operations comprises:
   comparing calculated ranging distance and direction from the calibrated predicted signal to an intended distance and an intended direction at deeper depths,
   wherein modifying the drilling of the drilling wellbore or adjusting drilling operations comprises increasing an excitation signal or changing a grounding option or stopping the drilling if the calibrated predicted signal is lower than a requirement.

4. The method of claim 1, wherein calibrating the predicted signal comprises:
   determining a scaling factor based on the ranging measurements;
   applying the scaling factor to the ranging model to create an updated ranging model; and
   calibrate the predicted signal based on the updated ranging model.

5. The method of claim 1, wherein calibrating the predicted signal comprises:
   creating a simplified ranging model;
   improving, based on the ranging measurements, the simplified ranging model having a homogenous formation resistivity;
   updating the homogeneous formation resistivity based on the ranging measurements; and
   calibrating the predicted signal based on the updated homogeneous formation resistivity.

6. The method of claim 1, wherein calibrating the predicted signal comprises:
   determining attenuation of the electromagnetic field from two ranging measurements;
   updating the ranging model based on the attenuation; and
   calibrating the predicted signal based on the updated ranging model.

7. The method of claim 1, wherein calibrating the predicted signal comprises:
   generating an updated resistivity profile based on an inversion of the ranging measurements;
   updating the ranging model based on the updated resistivity profile; and
   calibrating the predicted signal based on the updated ranging model.

8. A system comprising:
   a drill string having a drill bit to drill a drilling wellbore, the drill string having a sensor;
   a processor; and
   a machine-readable medium having instructions stored thereon that are executable by the processor to cause the processor to,
      simulate a ranging model of the drilling wellbore to be drilled, a target wellbore, and surrounding wellbores;
      simulate a predicted signal along measured depths of the drilling wellbore based on the ranging model;
      perform the following operations at an increment of a defined depth at which the drilling wellbore is to be drilled until the drilling wellbore has been drilled to the defined depth,
         detect, by the sensor, an electromagnetic field emanating from the target wellbore;
         determine ranging measurements to the target wellbore at the increment of the defined depth based on the electromagnetic field;
         record at least one background noise measurement in the drilling wellbore;
         generate a random noise based on the at least one background noise measurement;
         calibrate the predicted signal based on the ranging measurements and the random noise, wherein the random noise is imposed on a the predicted signal;
         determine ranging accuracy for deeper depth in the wellbore based on the calibrated predicted signal; and
         modify the drilling of the drilling wellbore or adjust drilling operations based on the determined ranging accuracy for deeper depths.

9. The system of claim 8, wherein the instructions executable by the processor to cause the processor to perform the following operations comprises instructions executable by the processor to cause the processor to:

detect a real-time ranging signal in the drilling wellbore with excitation on; and record the at least one background noise measurement in the drilling wellbore with excitation off, wherein the instructions executable by the processor to cause to the processor to calibrate the predicted signal comprise instructions executable by the processor to cause to the processor to calibrate the predicted signal based on the real-time ranging signal and add the random noise to the calibrated predicted signal.

10. The system of claim 8, wherein the instructions executable by the processor to cause the processor to perform the following operations comprises instructions executable by the processor to cause the processor to:

compare calculated distance and direction from calibrated predicted signal to an intended distance and an intended direction at deeper depths, wherein modifying the drilling of the drilling wellbore or adjusting drilling operations comprises increasing an excitation signal or changing a grounding option or stopping the drilling if the calibrated predicted signal is lower than a requirement.

11. The system of claim 8, wherein the instructions executable by the processor to cause the processor to calibrate the predicted signal comprises instructions executable by the processor to cause the processor to:

determine a scaling factor based on the ranging measurements;

apply the scaling factor to the ranging model to create an updated ranging model; and calibrate the predicted signal based on the updated ranging model.

12. The system of claim 8, wherein the instructions executable by the processor to cause the processor to calibrate the predicted signal comprises instructions executable by the processor to cause the processor to:

create a simplified ranging model;

improve, based on the ranging measurements, a simplified ranging model having a homogenous formation resistivity;

update the homogeneous formation resistivity based on the ranging measurements; and calibrate the predicted signal based on the updated homogeneous formation resistivity.

13. The system of claim 8, wherein the instructions executable by the processor to cause the processor to calibrate the predicted signal comprises instructions executable by the processor to cause the processor to:

determine attenuation of the electromagnetic field from two ranging measurements;

update the ranging model based on the attenuation; and calibrate the predicted signal based on the updated ranging model.

14. The system of claim 8, wherein the instructions executable by the processor to cause the processor to calibrate the predicted signal comprises instructions executable by the processor to cause the processor to:

generate an updated resistivity profile based on an inversion of the ranging measurements;

update the ranging model based on the updated resistivity profile; and calibrate the predicted signal based on the updated ranging model.

15. One or more non-transitory machine-readable media comprising instructions executable by a processor to cause the processor to:

simulate a ranging model of a drilling wellbore to be drilled by a drill string, a target wellbore, and surrounding wellbores;

simulate a predicted signal along measured depths of the drilling wellbore based on the ranging model;

perform the following operations at an increment of a defined depth at which the drilling wellbore is to be drilled until the drilling wellbore has been drilled to the defined depth, detect, by a sensor positioned on the drill string, an electromagnetic field emanating from the target wellbore;

determine ranging measurements to the target wellbore at the increment of the defined depth based on the electromagnetic field;

record at least one background noise measurement in the drilling wellbore;

generate a random noise based on the at least one background noise measurement;

calibrate the predicted signal based on the ranging measurements and the random noise, wherein the random noise is imposed on a the predicted signal;

determine ranging accuracy for all deeper depths in the wellbore based on the calibrated predicted signal; and make drilling decisions or adjust drilling operations based on the determined ranging accuracy for deeper depths.

16. The one or more non-transitory machine-readable media of claim 15, wherein the instructions executable by the processor to cause to the processor to perform the following operations comprises instructions executable by the processor to cause the processor to:

detect a real-time ranging signal in the drilling wellbore with excitation on; and record the at least one background noise measurement in the drilling wellbore with excitation off, wherein the instructions executable by the processor to cause to the processor to calibrate the predicted signal comprise instructions executable by the processor to cause to the processor to calibrate the predicted signal based on the real-time ranging signal and add the random noise to the calibrated predicted signal.

17. The one or more non-transitory machine-readable media of claim 15, wherein the instructions executable by the processor to cause to the processor to perform the following operations comprises instructions executable by the processor to cause the processor to:

compare calculated ranging distance and direction from calibrated predicted signal to an intended distance and an intended direction at deeper depths, wherein modifying the drilling of the drilling wellbore or adjusting drilling operations comprises increasing an excitation signal or changing a grounding option or stopping the drilling if the calibrated predicted signal is lower than a requirement.

18. The one or more non-transitory machine-readable media of claim 15, wherein the instructions executable by the processor to cause the processor to calibrate the predicted signal comprises instructions executable by the processor to cause to processor to:

determine a scaling factor based on the ranging measurements;

apply the scaling factor to the ranging model to create an updated ranging model; and calibrate the predicted signal based on the updated ranging model.

19. The one or more non-transitory machine-readable media of claim 15, wherein the instructions executable by the processor to cause the processor to calibrate the predicted signal comprises instructions executable by the processor to cause to processor to:
- create a simplified ranging model;
- improve, based on the ranging measurements, the simplified ranging model having a homogenous formation resistivity;
- update the homogeneous formation resistivity based on the ranging measurements; and
- calibrate the predicted signal based on the homogeneous formation resistivity.

20. The one or more non-transitory machine-readable media of claim 15, wherein the instructions executable by the processor to cause the processor to calibrate the predicted signal comprises instructions executable by the processor to cause to processor to:
- determine attenuation of the electromagnetic field from two ranging measurements;
- update the ranging model based on the attenuation; and calibrate the predicted signal based on the updated ranging model.

\* \* \* \* \*